W. A. WHITMORE.
WATER FEED FOR STEAM BOILERS.
APPLICATION FILED SEPT. 2, 1919.
1,383,891.
Patented July 5, 1921.
2 SHEETS—SHEET 1.
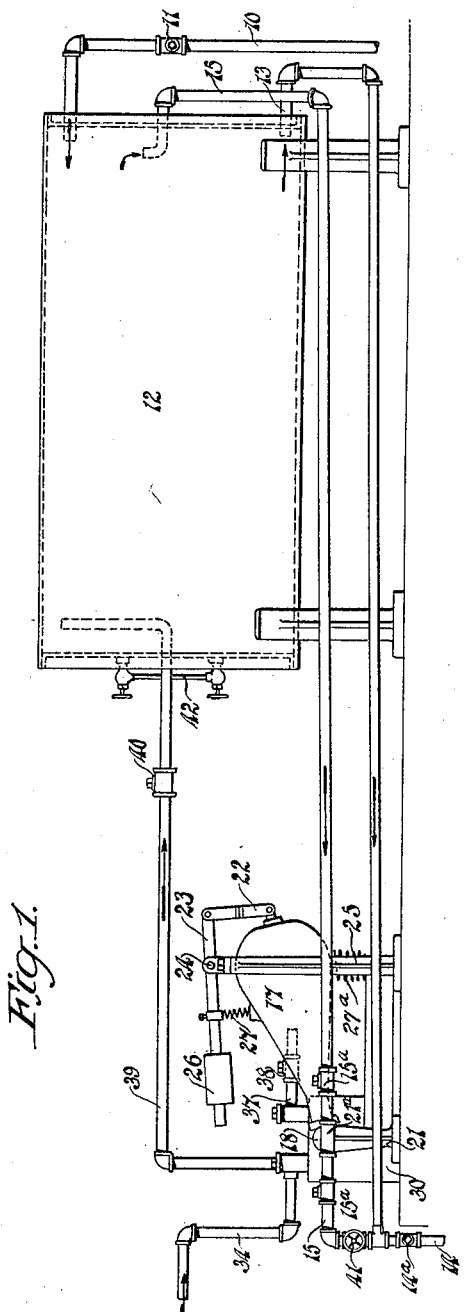
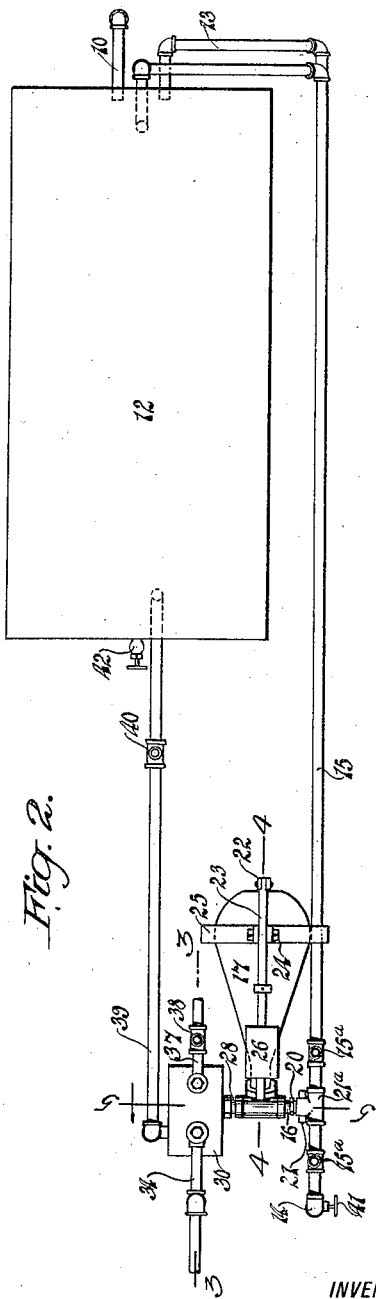
WITNESSES
Bernard Aebly
INVENTOR
William A. Whitmore
BY
ATTORNEYS

W. A. WHITMORE.
WATER FEED FOR STEAM BOILERS.
APPLICATION FILED SEPT. 2, 1919.

1,383,891.

Patented July 5, 1921.
2 SHEETS—SHEET 2.

WITNESSES

INVENTOR
William A. Whitmore
BY
ATTORNEYS

UNITED STATES PATENT OFFICE.

WILLIAM ALBERT WHITMORE, OF NELSONVILLE, OHIO.

WATER-FEED FOR STEAM-BOILERS.

1,383,891.   Specification of Letters Patent.   Patented July 5, 1921.

Application filed September 2, 1919. Serial No. 321,039.

*To all whom it may concern:*

Be it known that I, WILLIAM A. WHITMORE, a citizen of the United States, and a resident of Nelsonville, in the county of Athens and State of Ohio, have invented a new and Improved Water-Feed for Steam-Boilers, of which the following is a description.

My invention relates to feed means for steam boilers and more particularly relates to the type of boiler feed employing a steam trap into which the feed water is delivered and from which it flows to the boiler by gravity upon steam being admitted to the trap to balance the boiler pressure. The water drum of the steam trap of the class in question has a limited capacity and in practice delivers with each operation of the trap but three or four gallons of water.

The prime object of my invention is to provide a receiver to which the feed water is delivered by the supply pipe and so associated with the trap that with each operation of the trap, the water will flow to the boiler from both the trap drum and the receiver, whereby the receiver or a plurality of receivers similarly connected with the steam trap, may be employed to give any desired capacity, whereby any predetermined amount of water may be fed to the boiler with each operation of the trap.

The above and other objects as will appear are attained by means hereinafter particularly described.

Reference is to be had to the accompanying drawings forming a part of this specification, it being understood that the drawings are merely illustrative of one example of the invention.

Figure 1 is a side elevation of a feed water apparatus embodying my invention;

Fig. 2 is a plan view thereof;

Figure 3:
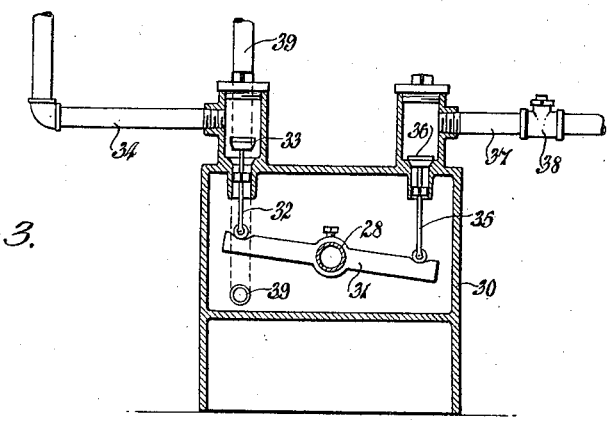
Figure 4:
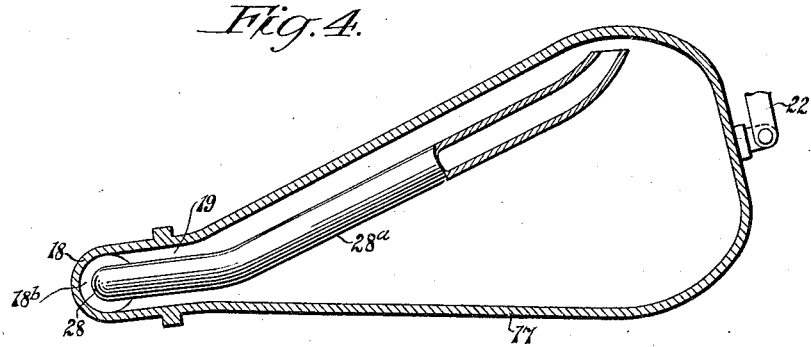
Figure 5:
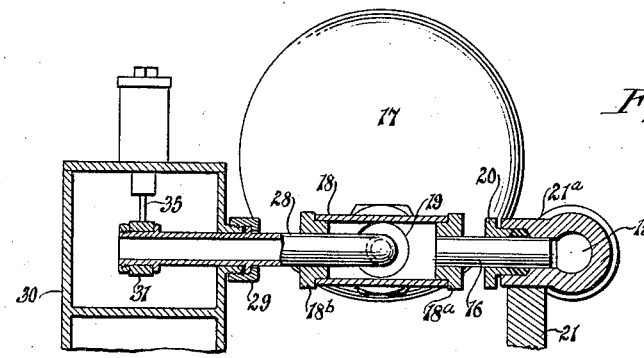

Figs. 3, 4 and 5 are enlarged sections respectively on the lines 3—3, 4—4 and 5—5, of Fig. 2.

In carrying out my invention in accordance with the illustrated example, the supply pipe 10 from any suitable source (not shown) has a check valve 11 and leads into a receiver tank 12. From the tank 12, near the bottom, leads an outlet pipe 13 connected with a feed pipe 14 leading to the boiler (not shown). Also, leading from the receiver 12 at a higher point above pipe 13 and preferably adjacent to the center of the receiver, is an overflow pipe 15 which connects by a pipe 16 with the drum 17 of the steam trap, said pipe 16 constituting also the outlet pipe for the discharge of the water from the drum 17 and connecting with the feed pipe 14 preferably by returning the water through said pipe 16 and the pipe 15 to said pipe 14. Said pipe 15 has check valves $15^a$ at both sides of the connection with the pipe 16, and the pipe 14 has a check valve $14^a$ below the connection with the pipe 13.

The pipe 16 connects with the drum 17 through the head $18^a$ of a chamber 18 forming the front end of said drum, communicating with the throat 19 leading to and from the body of the drum. In the operation of the trap as will appear, the drum 17 has vertical rocking movement and gives turning movement to the chamber 18 thereon, and, therefore, the pipe 16 is mounted to turn, said pipe extending through a gland 20 turning in a T-coupling $21^a$ on a standard 21 to establish communication between the pipes 15 and 16. In the particular trap illustrated, which in principle and its main features is of known form, the drum 17 thereof is suspended at its rear end by a link 22 from one end of a lever 23 fulcrumed between its ends as at 24 on a yoke-like standard 25, the other arm of the lever having a weight 26 serving, when the drum 17 is empty, to lift the drum to the raised position. A spring 27 may be employed, if desired, establishing connection between the weight arm of the lever and the drum 17 to constitute a shock absorber when trap tilts and bring the trap to rest quietly. The cushioning of the trap drum 17 may be further insured by a compression spring $27^a$ beneath said trap drum.

A steam pipe 28 extends laterally through the other head $18^b$ of chamber 18 and upwardly adjacent to the top of the drum 17. Said pipe 28 extends from the chamber 18 laterally through a stuffing box 29 and extends through a side of the valve chamber 30 in which it is adapted to have turning movement so that the said pipes 28 and 16 constitute trunnions on the drum in the rocking movement of the latter. Within the valve chamber 30 the pipe 28 is secured to a lever 31 between the ends of the latter and at one end said lever connects with the stem 32 of a valve 33 controlling the admission of steam from the steam pipe 34 leading from the boiler whereby to admit steam to the chamber 30 and pipe 28 through the drum 17. The opposite end of the lever 31 connects with the stem 35 of a valve 36, the opening of said valve permitting escape of the steam from the valve chamber to pipe 37 leading to the atmosphere and provided with a check valve 38. Leading also from the chamber 30 is a pipe 39 connecting said chamber with the top of the receiver 12. The pipe 15 between the pipe 16 and the feed pipe 14 has a globe valve 41 to regulate the flow of water from said drum 17 to said feed pipe. On the receiver 12 is a gage glass 42.

In operation, water having been supplied to the reservoir 12 at a height to overlie the pipe 15, the overflow will pass through pipes 15 and 16 to the drum 17. Water at this time will not flow to the discharge pipe 13, being opposed by the boiler pressure in the feed pipe 14. The drum 17 having been filled from the overflow pipe 15 will drop to the lower position and the rocking of the pipe 28 and lever 31 will open the valve 33 and permit steam to pass into the chamber 30, pipe 28 and drum 17, thereby equalizing the pressure and permitting the water to gravitationally flow from the drum to the boiler, it being understood that said drum and the receiver 12 are at a higher elevation than that of the boiler. At the same time steam will flow also through the pipe 39 to the receiver 12 equalizing pressure in the latter and permitting the water therein to gravitationally flow through the pipe 13 to the feed pipe 14 at the same time water is discharged from said drum 17 to the feed pipe. The valve 41 is so regulated that the drum 17 and receiver 12 will empty at approximately the same time. The drum having become empty of water, it will be raised by the weight 26, thereby closing the valve 33 and cutting off the steam from the live steam pipe 34. At the same time, the lever 31 will open the valve 36, permitting the steam to escape and thereby steam is permitted to escape from the drum 17 through pipe 28 and chamber 30 to the atmosphere through pipe 37 and permitting the steam to escape from the receiver 12 through the pipes 15, 16, drum 17, and pipe 28 into valve chamber 30 and to the atmosphere through valve 36, pipe 37 and valve 38, whereby a vacuum is formed in the drum and receiver. Air is prevented from entering the atmospheric pipe 37 by the check valve 38 and thereby the vacuum is effective in both the drum and the receiver 12, thereby assisting greatly in elevating the water to said receiver. Ordinarily, water is made to flow to the receiver caused by pressure in the return lines or other means. It will be obvious from the foregoing that the tank 12 is of any desired capacity or any number of tanks may be connected with the supply pipe 10 and with the steam chamber 30 because the receiver tank feeds to the boiler direct independently of the trap drum and with the trap as a means of controlling the live steam valve by reason of the water supplied from the receiver, the same valve serves to equalize the pressure in the tank or tanks and in the drum. In this manner the small steam trap may be made to feed a boiler of any size or any number of boilers. The receiver has no moving parts to be subjected to wear and therefore will last indefinitely. Furthermore, the receiver being large easily disposes of any air that is in the lines on starting out as it will have a clear passage through the tank to the receiver through pipes 15, 16, drum 17, pipe 28 and valve chamber 30, to escape to the atmosphere through the pipe 37. Should the check valve 11 or other check valve in the supply pipe 10 become leaky, it will have no effect on the operation of the system since water cannot return to the lines after it has been admitted to the receiver 12. The apparatus, it will be seen, requires no attention when once set, it uses no oil, it is absolutely automatic, and will feed water into the boiler no matter what the boiler pressure. Also, the various pipe connections involved in the employment of the receiver may be constructed from standard parts readily procurable and the system does away entirely with the pump. The system has the advantage also that the reservoir may be placed anywhere so that it is at a higher elevation than the boiler.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims. It will be clear for example, that the receiver may be employed with any steam trap where connection may be established between the steam pipe 39 leading to the receiver and the live steam valve or chamber controlled thereby.

Having thus described my invention, I claim:

A water feed apparatus for steam boilers, including a steam trap, a receiver adapted to contain water and having an outlet independent of the steam trap and adapted to be connected with the steam boiler for the direct feed of the water from the receiver to the boiler, a supply connection between the receiver and trap to direct water to the trap from the receiver, and means controlled by the operation of the trap to direct steam to the receiver from the boiler to balance the pressure of the receiver and cause the discharge of water to the boiler from the receiver, together with means independent of the receiver to connect the trap with the boiler and deliver water to the boiler from the trap without passing it through the receiver.

WILLIAM ALBERT WHITMORE.